US012776515B2

(12) United States Patent
Kim et al.

(10) Patent No.: US 12,776,515 B2
(45) Date of Patent: Oct. 27, 2026

(54) OXIDE-BASED FILM SHEET, OXIDE-BASED SOLID ELECTROLYTE SHEET, AND ALL-SOLID LITHIUM SECONDARY BATTERY

(71) Applicant: SK On Co., Ltd., Seoul (KR)

(72) Inventors: Kyeong Joon Kim, Daejeon (KR); Ji Young Park, Daejeon (KR); Eun Jeong Yi, Daejeon (KR); Min Kyu Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/479,963

(22) Filed: Oct. 3, 2023

(65) Prior Publication Data

US 2024/0113328 A1 Apr. 4, 2024

(30) Foreign Application Priority Data

Oct. 4, 2022 (KR) ........................ 10-2022-0126435
Sep. 27, 2023 (KR) ........................ 10-2023-0130397

(51) Int. Cl.
*H01M 10/0562* (2010.01)
*H01M 10/0525* (2010.01)

(52) U.S. Cl.
CPC .................. *H01M 10/0562* (2013.01); *H01M 10/0525* (2013.01); *H01M 2300/0071* (2013.01); *H01M 2300/0094* (2013.01)

(58) Field of Classification Search
CPC ............. H01M 50/431; H01M 50/434; H01M 10/0562; H01M 10/0561
See application file for complete search history.

(56) References Cited

U.S. PATENT DOCUMENTS 11,600,853 B1 * 3/2023 Brown .............. H01M 10/0525
11,735,755 B2 * 8/2023 Hall ...................... B29C 64/182 148/525
2007/0278092 A1 12/2007 Irvine et al.
2012/0231350 A1 * 9/2012 Nishida ............. H01M 10/0562 429/322
2013/0183589 A1 * 7/2013 Minamida .......... H01M 10/0585 429/304

(Continued)

FOREIGN PATENT DOCUMENTS

CN 107210469 A 9/2017
CN 107851862 A 3/2018

(Continued)

OTHER PUBLICATIONS

KR102414881B1 Translation from Espacenet (Year: 2022).*

(Continued)

*Primary Examiner* — Nathanael T Zemui
(74) *Attorney, Agent, or Firm* — IP&T GROUP LLP

(57) ABSTRACT

An oxide-based film sheet according to an embodiment of the disclosure includes an oxide-based particle, wherein the oxide-based particle includes a colored oxide particle capable of absorbing light energy in a visible light spectrum. An oxide-based solid electrolyte sheet according to an embodiment of the disclosure may be prepared by light-sintering the oxide-based film sheet. According to an embodiment of the disclosure, an oxide-based solid electrolyte sheet in which a connection structure between particles, shapes of the particles, porosity, or the like are appropriately provided may be prepared by light-sintering.

13 Claims, 9 Drawing Sheets

(56) References Cited

U.S. PATENT DOCUMENTS

| | | | | |
|---|---|---|---|---|
| 2015/0171463 | A1* | 6/2015 | Liang | H01M 10/052 429/322 |
| 2016/0141716 | A1* | 5/2016 | Ito | H01M 10/0562 429/162 |
| 2016/0233534 | A1 | 8/2016 | Leah et al. | |
| 2016/0308253 | A1 | 10/2016 | Robins et al. | |
| 2017/0005366 | A1* | 1/2017 | Shin | H01M 10/052 |
| 2017/0141429 | A1* | 5/2017 | Lee | H01M 10/052 |
| 2019/0280330 | A1* | 9/2019 | Albano | H01M 10/0562 |
| 2021/0245296 | A1 | 8/2021 | Ye et al. | |
| 2024/0194935 | A1* | 6/2024 | Dawson | H01M 10/0562 |

FOREIGN PATENT DOCUMENTS

| | | | |
|---|---|---|---|
| KR | 20200010069 | A | 1/2020 |
| KR | 20200127769 | A | 11/2020 |
| KR | 102270782 | B1 * | 6/2021 |
| KR | 20210090569 | A | 7/2021 |
| KR | 102414881 | B1 * | 6/2022 |

OTHER PUBLICATIONS

KR102270782B1 Translation from Espacenet (Year: 2021).*

Zhao et.al, "Sintering analysis of garnet-type ceramic as oxide solid electrolytes for rapid Li+migration" (Year: 2022).*

Linda C. Hoff et al., Laser sintering of ceramic-based solid-state battery materials, Proceedings of the SPIE, Mar. 4, 2022, pp. 119890E-1-119890E-8, vol. 11989, XP060155302, ISSN: 0277-786X, doi: 10.1117/12.2607752, ISBN: 978-1-5106-5738-0.

Extended European Search Report for the European Patent Application No. 23201325.0 issued by the European Patent Office on Mar. 11, 2024.

* cited by examiner

OXIDE-BASED FILM SHEET, OXIDE-BASED SOLID ELECTROLYTE SHEET, AND ALL-SOLID LITHIUM SECONDARY BATTERY

CROSS-REFERENCE TO RELATED APPLICATION(S)

This patent document claims the priority and benefits of Korean Patent Application No. 10-2022-0126435 filed on Oct. 4, 2022, and Korean Patent Application No. 10-2023-0130397 filed on Sep. 27, 2023, the disclosure of which is incorporated herein by reference in its entirety.

TECHNICAL FIELD

The technology and implementations disclosed in this patent document generally relates to solid lithium secondary battery technology and, more particularly, to solid electrolyte technology for a lithium secondary battery.

BACKGROUND

As interest in environmental issues has recently increased, research into an electric vehicle (EV) that may replace a fossil fuel-based vehicle, and an energy storage system (ESS) that utilizes renewable energy, or the like, is actively underway. A lithium secondary battery having a high discharge voltage and output stability may mainly be used as a power source for such an electric vehicle (EV) or the like.

Meanwhile, there may be problems in that a conventional lithium secondary battery using a liquid electrolyte such as an organic solvent or the like have a risk of ignition due to leakage of the electrolyte, the electrolyte is decomposed by an electrode reaction to expand the battery, or the like. In addition, due to a separator included in the conventional lithium secondary battery in order to prevent the problems, there may be a limit to securing a high energy density of the battery. Accordingly, in order to solve the above problems, research and development of an all-solid lithium secondary battery to which a solid electrolyte is applied are being actively conducted.

The solid electrolyte applied to the all-solid lithium secondary battery may be mainly classified into a sulfide-based solid electrolyte, a polymer-based solid electrolyte, an oxide-based solid electrolyte, and the like, and thereamong, the oxide-based solid electrolyte is attracting attention as a next-generation solid electrolyte material due to excellent chemical/thermal stability, mechanical strength, or the like, thereof.

SUMMARY

The technology and implementations disclosed in this patent document is directed an oxide-based film sheet, an oxide-based solid electrolyte sheet, and an all-solid lithium secondary battery including the same as defined in the independent claims. Various embodiments of this patent document are defined in the dependent claims.

According to an aspect of this patent document, an oxide-based film sheet capable of manufacturing an oxide-based solid electrolyte sheet having excellent performance such as durability or the like may be provided.

According to another aspect of this patent document, an oxide-based solid electrolyte sheet that may be manufactured in a short period of time and may be thinned and enlarged in a large area, without additional processing, may be provided.

According to another aspect of this patent document, an oxide-based solid electrolyte sheet that may be manufactured, without problems such as substrate deformation and sheet damage, and having excellent durability, may be provided.

According to another aspect of this patent document, an all-solid lithium secondary battery having improved safety, energy density, or the like, including an oxide-based solid electrolyte sheet having excellent performance, may be provided.

An oxide-based film sheet according to an implementation of the disclosure of this patent document includes an oxide-based particle, wherein the oxide-based particle includes a colored oxide particle capable of absorbing light energy in a visible light spectrum.

According to an embodiment, the colored oxide particle may be included in an amount of 0.1 to 10% by weight based on a total weight of the oxide-based particle.

According to an embodiment, the colored oxide particle may include an oxide of at least one of the elements selected from chromium (Cr), manganese (Mn), cobalt (Co), nickel (Ni), copper (Cu), niobium (Nb), molybdenum (Mo), ruthenium (Ru), rhodium (Rh), palladium (Pd), vanadium (V), tungsten (W), iron (Fe), cerium (Ce), praseodymium (Pr), neodymium (Nd), terbium (Tb), erbium (Er), zinc (Zn), bismuth (Bi), arsenic (As), antimony (Sb), and selenium (Se).

According to an embodiment, the oxide-based particle may include a lithium conductive oxide-based particle.

According to an embodiment, the lithium conductive oxide-based particle may include at least one compound selected from a garnet compound, a NASICON compound, and a perovskite compound.

According to an embodiment, the lithium conductive oxide-based particle may include at least one selected from zirconium (Zr), phosphate ($PO_4$), and titanium (Ti).

According to an embodiment, the oxide-based film sheet may be prepared by forming and drying a slurry containing the colored oxide particle on a substrate.

According to an embodiment, in the oxide-based film sheet, an L value according to a CIELAB color system may be 80 or less.

An oxide-based solid electrolyte sheet according to an implementation of the disclosure may be prepared by light-sintering the oxide-based film sheet according to any one of the above embodiments.

According to an embodiment, the light-sintering may be performed in a pulsed method.

According to an embodiment, light irradiation time per pulse (on-time) during the light-sintering may be 1000 to 4500 μs.

According to an embodiment, an operating voltage during the light-sintering may be 100 to 450 V.

According to an embodiment, a temperature of a substrate during the light-sintering may be maintained at 300° C. or less.

According to an embodiment, light energy irradiated during the light-sintering may be 25 to 150 $J/s \cdot cm^2$.

According to an embodiment, the oxide-based solid electrolyte sheet may have an area of 0.25 $cm^2$ or more, or 0.5 to 50 $cm^2$, and a thickness of 10 to 300 μm.

According to an embodiment, the oxide-based solid electrolyte sheet may have a porosity of 0.1 to 40% and an ionic conductivity of $10^{-6}$ S/cm to $10^{-2}$ S/cm.

A solid electrolyte structure according to an implementation of the disclosure includes a substrate, and a sintered oxide-based solid electrolyte sheet on the substrate, wherein the oxide-based solid electrolyte sheet has a porosity of 0.1 to 40% and an ionic conductivity of $10^{-6}$ S/cm to $10^{-2}$ S/cm, and the oxide-based solid electrolyte sheet has an area of 0.25 $cm^2$ or more and a thickness of 10 to 300 μm.

According to an embodiment, upon energy dispersive X-ray spectroscopy (EDS) analysis of a surface of the oxide-based solid electrolyte sheet, an amount of a binder burning residue contained in the oxide-based solid electrolyte sheet may be 10 at % to 80 at %.

According to an embodiment, the oxide-based solid electrolyte sheet may include at least one selected from zirconium (Zr), phosphate ($PO_4$), and titanium (Ti); and at least one element selected from chromium (Cr), manganese (Mn), cobalt (Co), nickel (Ni), copper (Cu), niobium (Nb), molybdenum (Mo), ruthenium (Ru), rhodium (Rh), palladium (Pd), vanadium (V), tungsten (W), iron (Fe), cerium (Ce), praseodymium (Pr), neodymium (Nd), terbium (Tb), erbium (Er), zinc (Zn), bismuth (Bi), arsenic (As), antimony (Sb), and selenium (Se).

An all-solid lithium secondary battery according to an implementation of the disclosure includes the solid electrolyte structure according to any one of the above-described embodiments.

BRIEF DESCRIPTION OF DRAWINGS

Certain aspects, features, and advantages of the disclosed technology may be illustrated by the following detailed description with reference to the accompanying drawings.

DETAILED DESCRIPTION

Figure 1A:
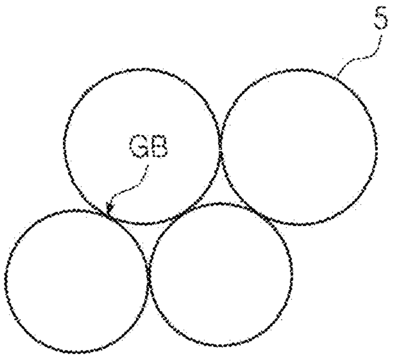
FIGS. 1A to 1D are conceptual diagrams respectively illustrating a configuration in which a connection structure between particles and shapes of the particles are changed as sintering progresses.

Hereinafter, various embodiments will be described with reference to various examples. However, embodiments are not limited to embodiments described below, and may be modified in various other forms.

In the present specification, a 'sintering' phenomenon is a phenomenon in which particles in a form of powder come into close contact with each other by external energy. For example, a 'sintering' phenomenon refers to a process in which the particles in a form of powder are brought into close contact by a thermal activation process to form a single mass.

In this specification, 'light-sintering' refers to sintering by inducing an exothermic phenomenon caused by a resonance phenomenon between an intrinsic wavelength region of a material and a wavelength region of light, or a heat transfer phenomenon caused by photothermal conversion in which absorbed light is converted into heat, through light, to generate a thermal activation reaction in the material.

In this specification, a 'colored oxide particle' refers to an oxide particle having colors, except for perfect white (e.g., when an L value according to a CIELAB color system is 100) that theoretically reflects all light. In this case, 'colored' refers to a case in which an L value according to a CIELAB color system is less than 100, more specifically, less than 80, and an 'oxide particle' refers to a particle in which a metal oxide containing a metal element is powdered.

When a general high-temperature sintering process is applied in manufacture of an oxide molded body, as the oxide molded body is formed by sintering at a temperature of 1000° C. or higher for a long period of time from 1 hour to 24 hours or more, a component such as lithium or the like may volatilize or evaporate to lose a material, and to be difficult to control a density according to sintering conditions. In addition, as a substrate is entirely heated, the substrate may be deformed or destroyed, and additional processing may be required due to difficulties in thinning and forming a homogeneous surface of an oxide-based sheet.

In a rapid thermal annealing (RTA) process or a process using microwave, it is possible to proceed in a shorter period of time, as compared to the general high-temperature sintering process, by increasing the temperature quickly, but problems of deformation or destruction of the substrate may be still difficult to solve. In addition, in a process using a laser, as a reaction proceeds locally in the vicinity of a region in which the laser is incident, an area to be applied during a sintering process may be narrow, and the sintering process may take a long time.

According to an embodiment of the disclosure, a colored oxide particle capable of absorbing light energy in a visible light spectrum may be used, and an oxide-based solid electrolyte sheet may be prepared by a light-sintering process using light energy, the above problems may be substantially solved.

Hereinafter, specific implementations will be described below with reference to FIGS. 1A to 9.

FIGS. 1A to 1D are conceptual diagrams respectively illustrating a configuration in which a connection structure between particles and shapes of the particles are changed as sintering progresses.

Figure 2A:
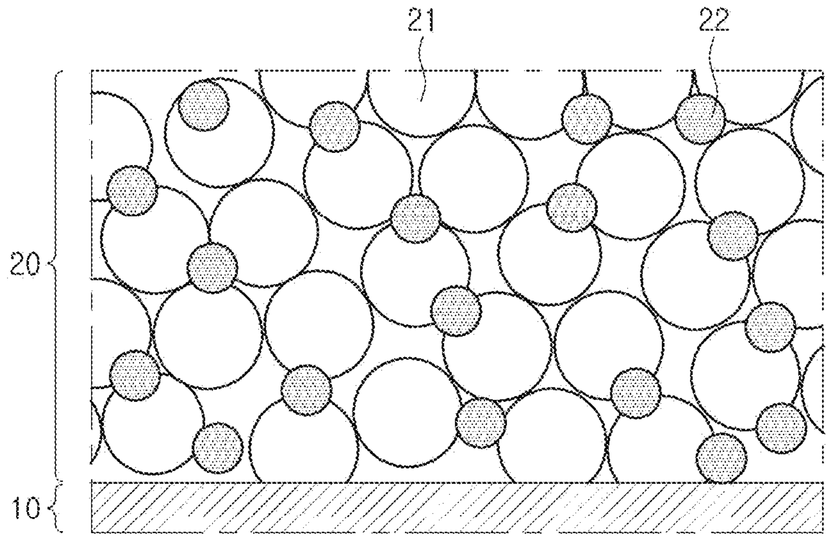
FIG. 2A is a conceptual diagram schematically illustrating a structure of an oxide-based film sheet and a contact form between oxide-based particles included in the oxide-based film sheet according to an implementation.

FIG. 2A is a conceptual diagram schematically illustrating a structure of an oxide-based film sheet and a contact form between oxide-based particles included in the oxide-based film sheet according to an embodiment.

Figure 2B:
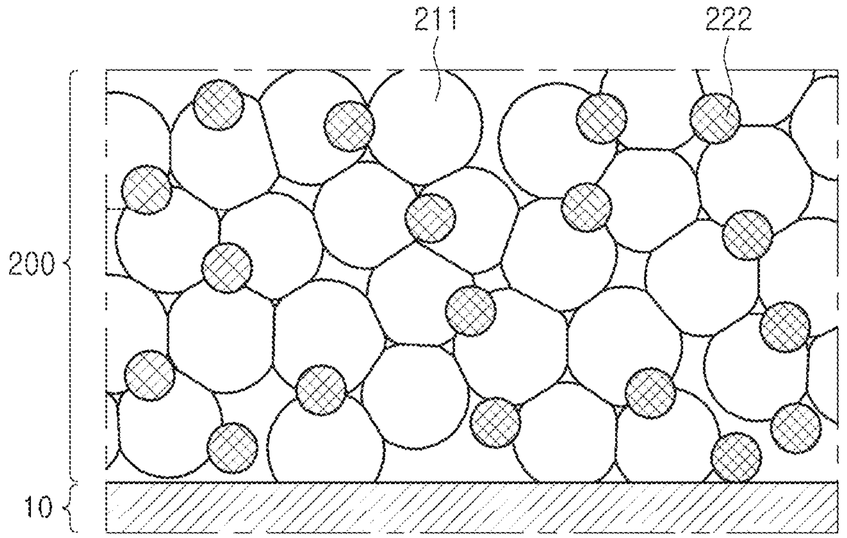
FIG. 2B is a conceptual diagram schematically illustrating a structure of an oxide-based solid electrolyte sheet and a contact form between oxide-based particles included in the oxide-based solid electrolyte sheet according to an embodiment.

FIG. 2B is a conceptual diagram schematically illustrating a structure of an oxide-based solid electrolyte sheet and a contact form between oxide-based particles included in the oxide-based solid electrolyte sheet according to an embodiment.

Figure 3A:
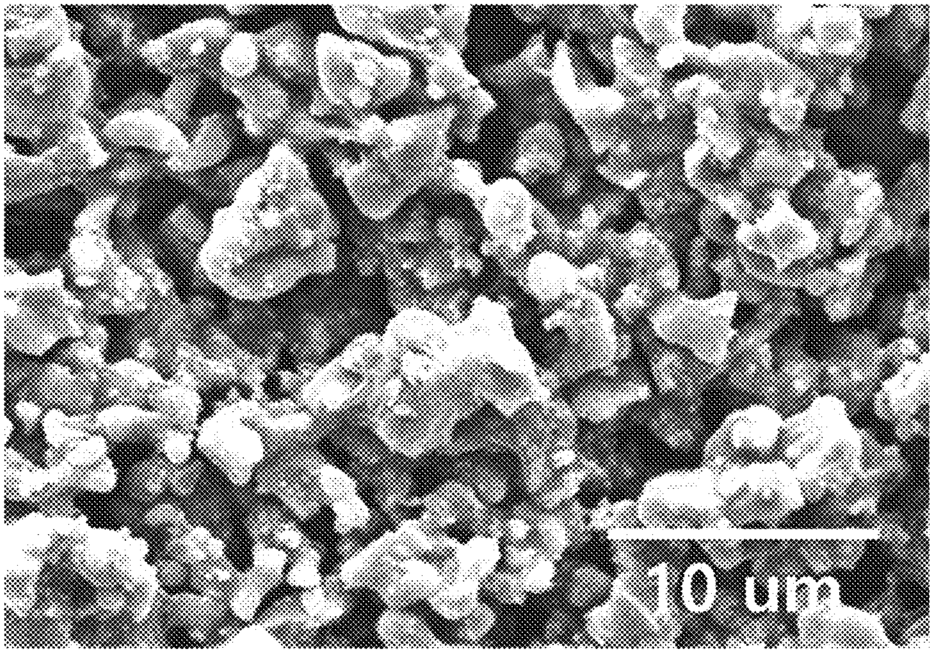
FIGS. 3A and 3B are views respectively illustrating a surface of an oxide-based solid electrolyte sheet according to Inventive Examples observed by a microscope.
Figure 3B:
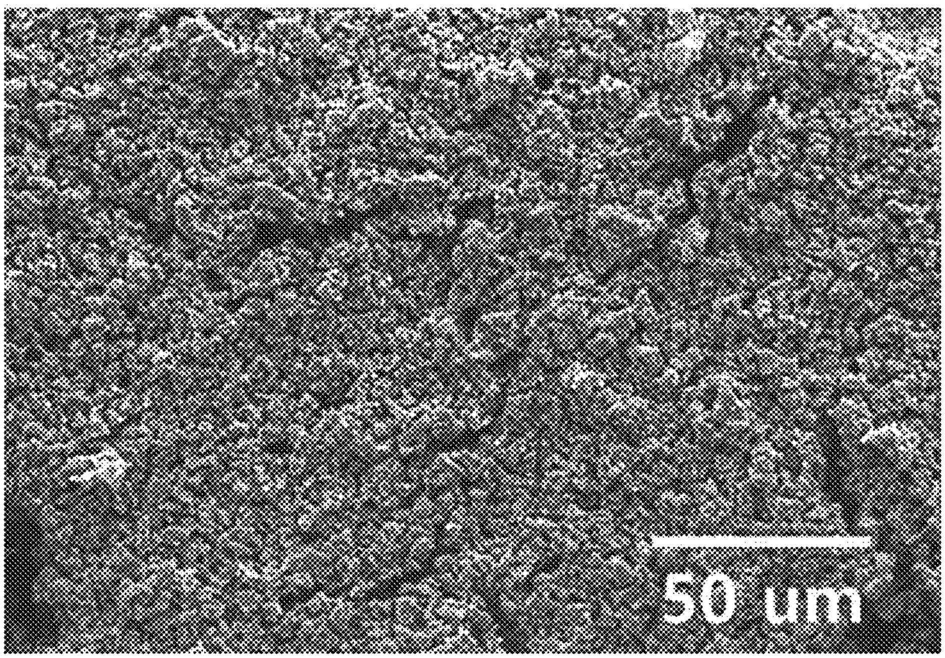

FIGS. 3A and 3B are views respectively illustrating a surface of an oxide-based solid electrolyte sheet according to Inventive Examples observed by a microscope.

Figure 4A:
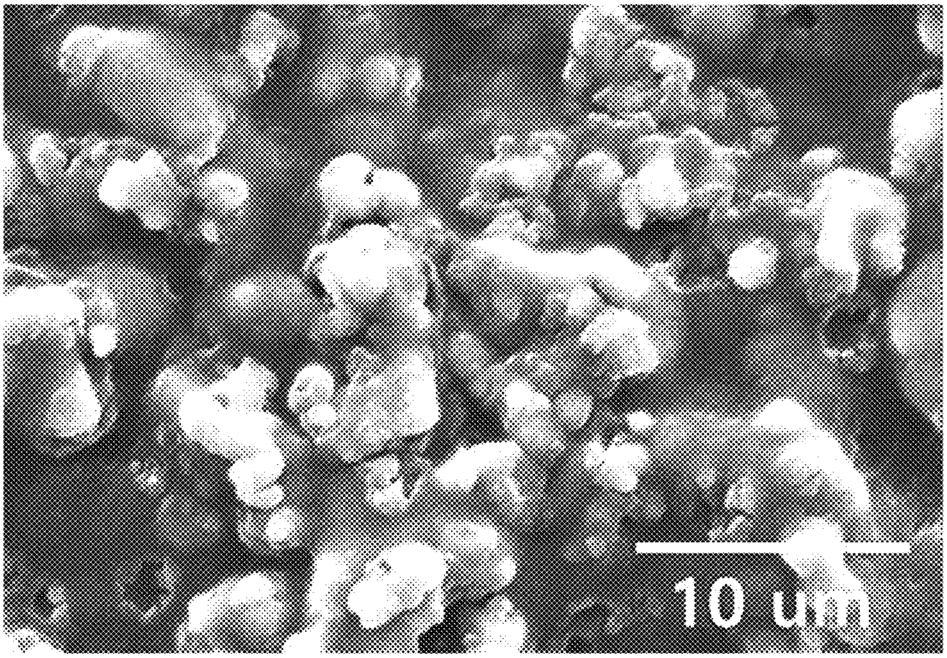
FIGS. 4A and 4B are views respectively illustrating a surface of an oxide-based solid electrolyte sheet according to Comparative Examples observed by a microscope.
Figure 4B:
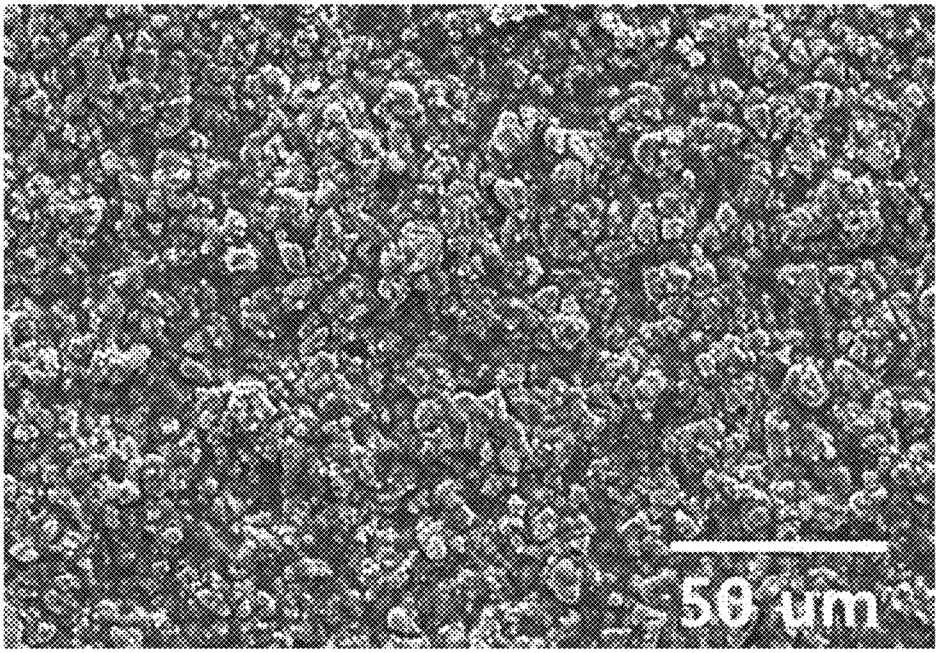

FIGS. 4A and 4B are views respectively illustrating a surface of an oxide-based solid electrolyte sheet according to Comparative Examples observed by a microscope.

Figure 5A:
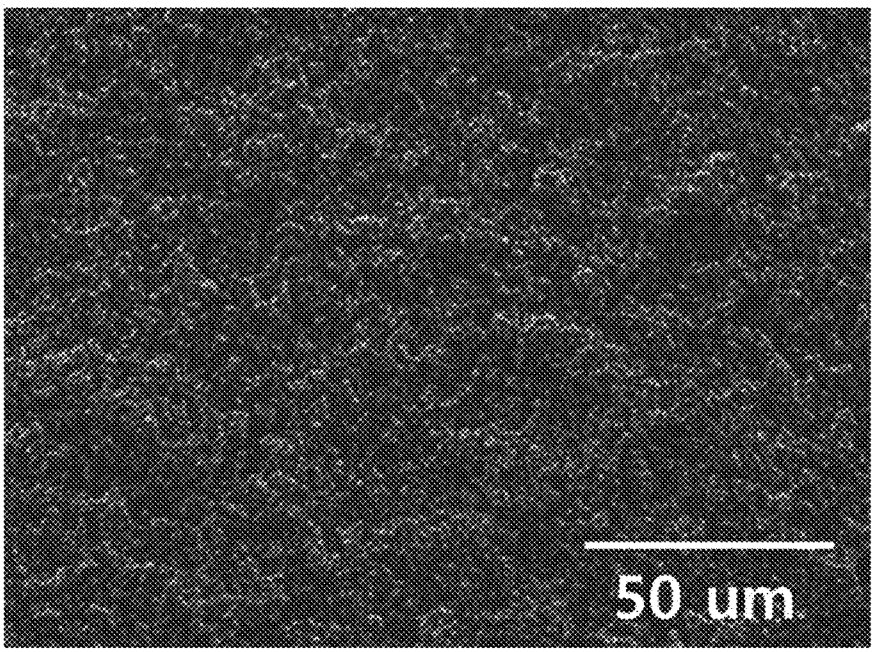
FIGS. 5A and 5B are views illustrating an image in which element distribution results are superimposed, and individual analysis results for a carbon element (C K-α), by performing elemental analysis of a surface of an oxide-based solid electrolyte sheet for a solid electrolyte structure according to Inventive Examples, respectively.
Figure 5B:
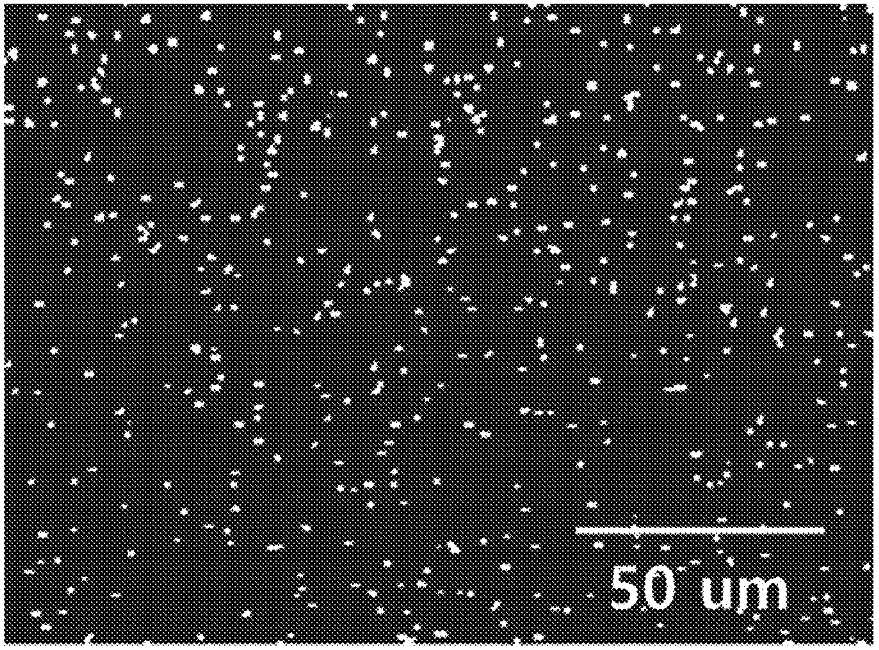

FIGS. 5A and 5B are views illustrating an image in which element distribution results are superimposed, and individual analysis results for a carbon element (C K-$\alpha$), by performing elemental analysis of a surface of an oxide-based solid electrolyte sheet for a solid electrolyte structure according to Inventive Examples, respectively.

Figure 6A:
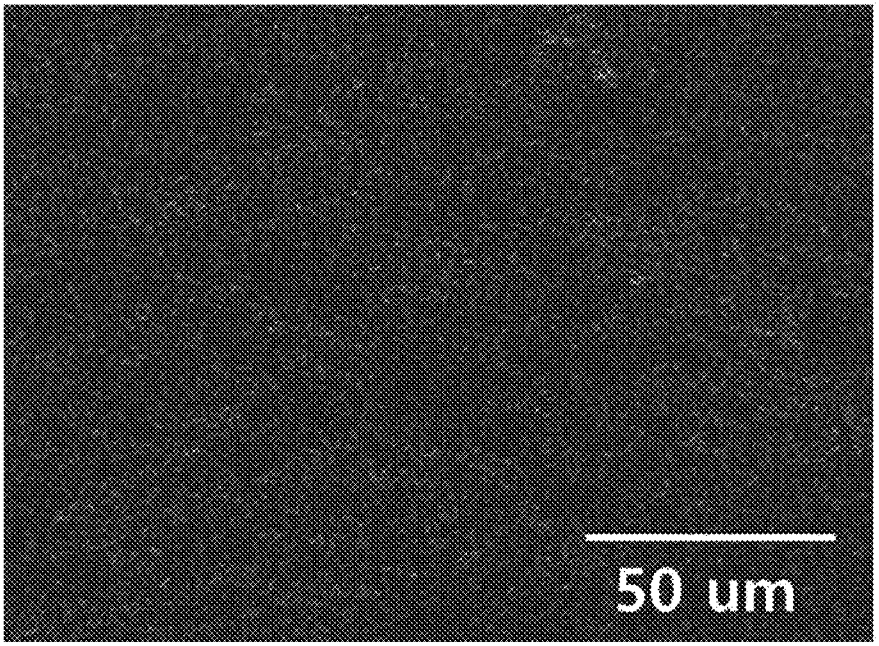
FIGS. 6A and 6B are views illustrating an image in which element distribution results are superimposed, and individual analysis results for a carbon element (C K-α), by performing elemental analysis of a surface of an oxide-based solid electrolyte sheet for a solid electrolyte structure according to Comparative Examples, respectively.
Figure 6B:
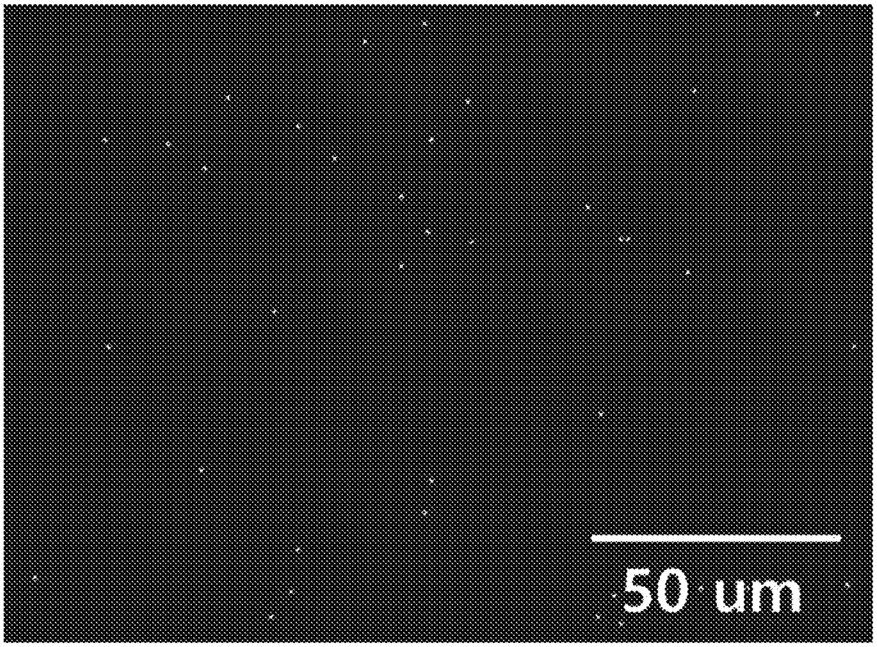

FIGS. 6A and 6B are views illustrating an image in which element distribution results are superimposed, and individual analysis results for a carbon element (C K-$\alpha$), by performing elemental analysis of a surface of an oxide-based solid electrolyte sheet for a solid electrolyte structure according to Comparative Examples, respectively.

Figure 7A:
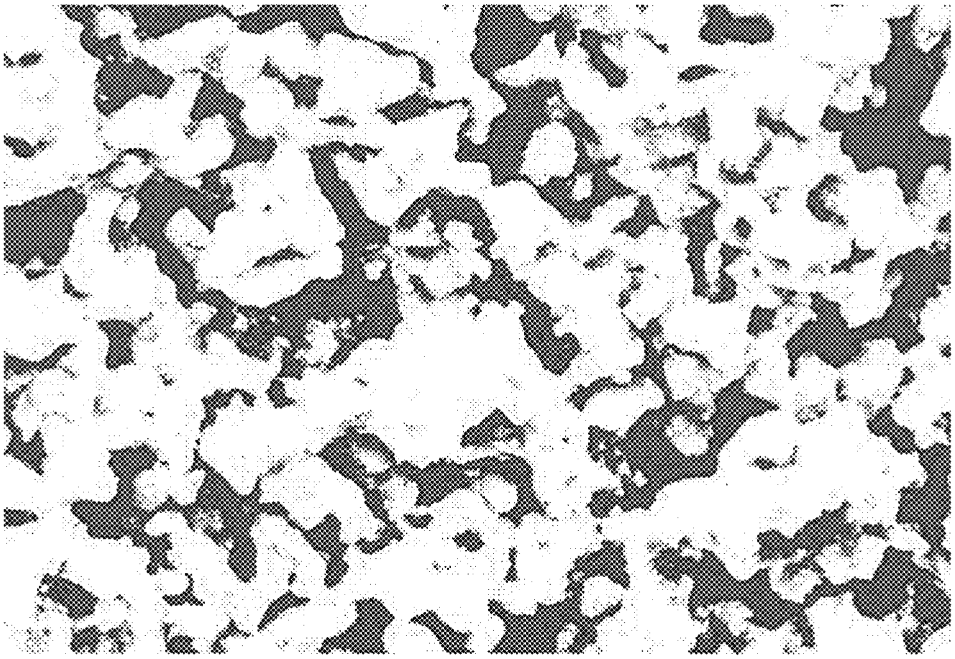
FIGS. 7A and 7B are views illustrating observation of sheet void distribution by performing porosity analysis on oxide-based solid electrolyte sheets according to Inventive Examples and Comparative Examples, respectively.
Figure 7B:
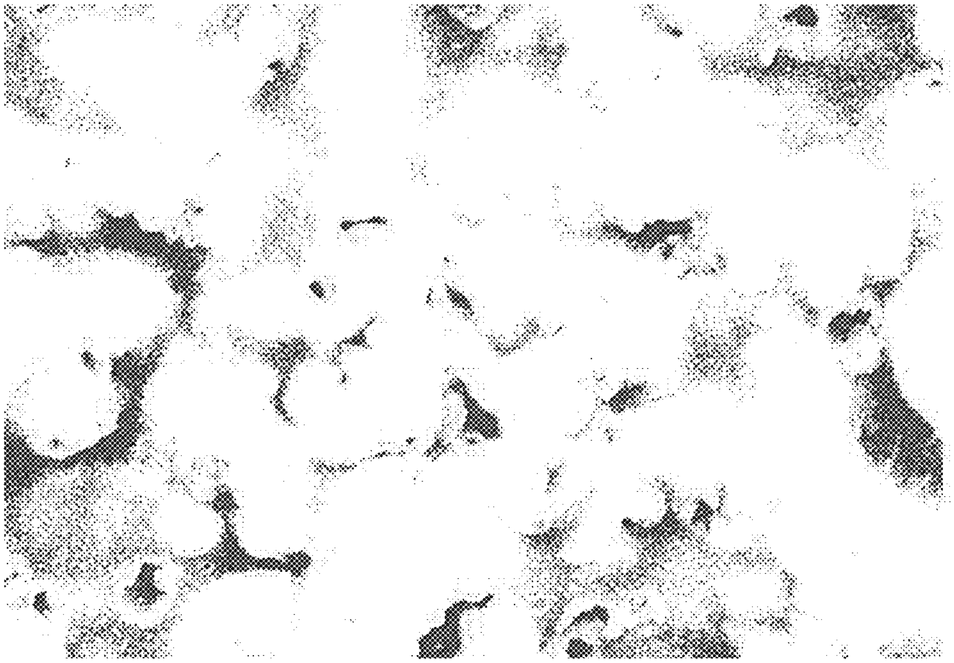

FIGS. 7A and 7B are views illustrating observation of sheet void distribution by performing porosity analysis on oxide-based solid electrolyte sheets according to Inventive Examples and Comparative Examples, respectively.

Figure 8:
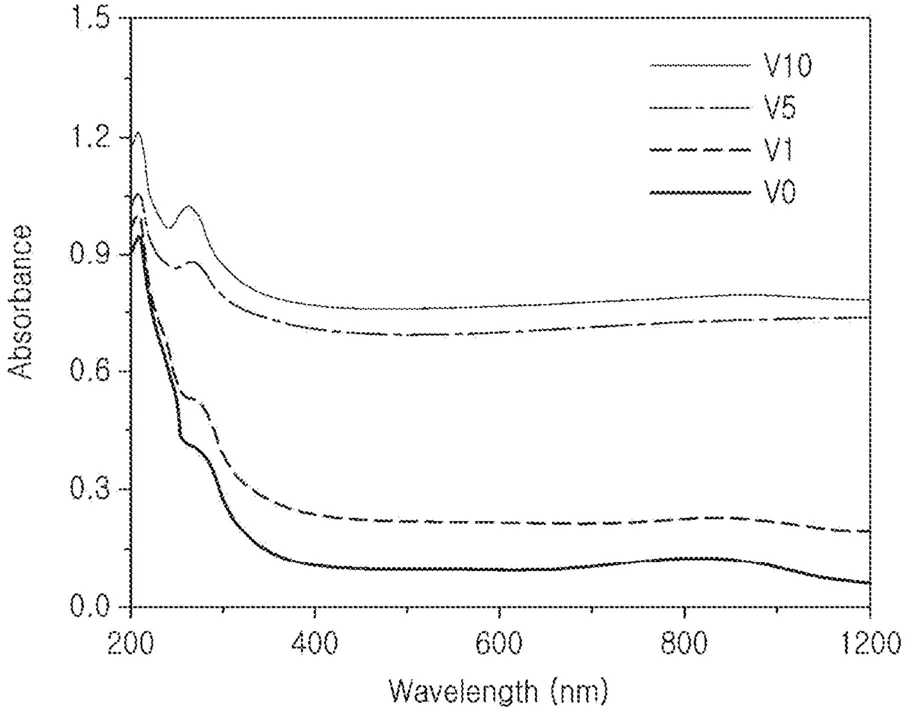
FIG. 8 is a graph illustrating results of absorbance analysis at a wavelength of 200 to 1200 nm for oxide-based solid electrolyte sheets according to Inventive Examples, manufactured by changing amounts of colored oxide particle.

FIG. 8 is a graph illustrating results of absorbance analysis at a wavelength of 200 to 1200 nm for oxide-based solid electrolyte sheets according to Inventive Examples, manufactured by changing amounts of colored oxide particle.

Figure 9:
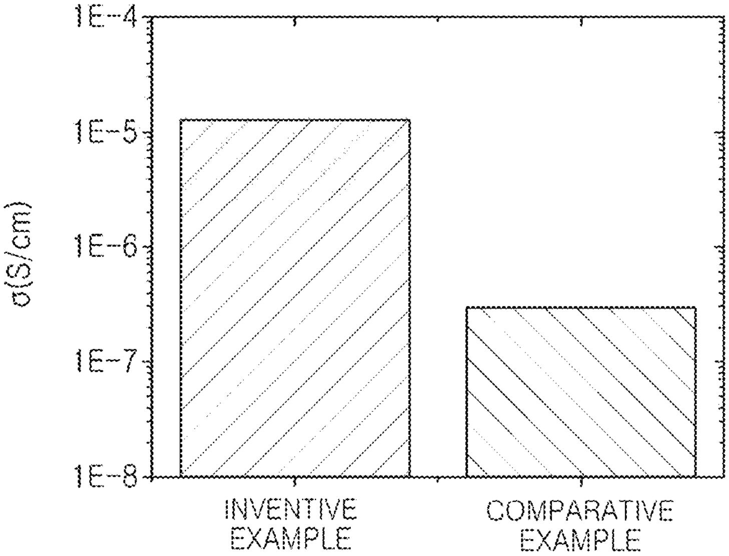
FIG. 9 is a graph illustrating results of measuring ionic conductivity of oxide-based solid electrolyte sheets according to Inventive Examples and Comparative Examples, respectively.

FIG. 9 is a graph illustrating results of measuring ionic conductivity of oxide-based solid electrolyte sheets according to Inventive Examples and Comparative Examples, respectively.

Oxide-Based Film Sheet 20

Referring to FIG. 2A, an oxide-based film sheet 20 according to an embodiment may include an oxide-based particle, and the oxide-based particle may include a colored oxide particle 22 capable of absorbing light energy in a visible light spectrum.

The colored oxide particle 22 may absorb light energy in the visible light spectrum, and the light energy in the visible light spectrum refers to light energy in an electromagnetic wave region within a wavelength range of 400 to 700 nm. When the oxide-based film sheet 20 includes the colored oxide particle 22, sintering may proceed more smoothly during a light-sintering process to be described below, and thus the oxide-based solid electrolyte sheet having excellent durability, ionic conductivity, or the like may be manufactured.

When light is irradiated to the oxide-based film sheet 20, heat may be generated due to absorbed light excluding reflected light and projected light, and a temperature of a material in the sheet may increase. When this process is repeated, a sintering effect (hereinafter referred to as 'light-sintering') may appear while the temperature of the material in the sheet, which has been raised due to generation of heat, is maintained momentarily. An oxide-based solid electrolyte sheet 200 to be described below may be manufactured by performing the light-sintering process on the oxide-based film sheet 20. The oxide-based film sheet 20 may include the colored oxide particle 22 capable of absorbing the light energy in the visible light spectrum. An absorption rate of light absorbed by the oxide-based film sheet 20 may be adjusted. Through this, properties of the oxide-based solid electrolyte sheet 200 manufactured by the light-sintering may be easily adjusted as needed.

The colored oxide particle 22 may be included in an amount of 0.1 to 10% by weight based on a total weight of the oxide-based particle. In some embodiments, the colored oxide particle 22 may be included in an amount of 0.5 to 5% by weight or 0.7 to 2% by weight based on the total weight of the oxide-based particle. When an amount of the colored oxide particle 22 is within the above-described range, properties such as ion conductivity or the like of the prepared solid electrolyte sheet may be maintained, the light-sintering process may proceed smoothly, and durability of the solid electrolyte sheet may be further improved, by improving absorbance while maintaining a high amount of a parent oxide particle, for example, a lithium conductive oxide-based particle or the like. An addition amount of the colored oxide particle 22 may be confirmed by measuring a fraction of the colored oxide particle in total oxide particles by, for example, inductively coupled plasma mass spectrometry (ICP-MS).

The colored oxide particle 22 may be a particle capable of absorbing light energy in the visible light spectrum, and an oxide particle having colors, except for perfect white (e.g., when an L value according to a CIELAB color system is 100) that theoretically reflects all light, but is not particularly limited thereto. For example, the colored oxide particle 22 may include at least one element selected from a transition metal element such as chromium (Cr), manganese (Mn), cobalt (Co), nickel (Ni), copper (Cu), niobium (Nb), molybdenum (Mo) ruthenium (Ru), rhodium (Rh), palladium (Pd), vanadium (V), tungsten (W), iron (Fe), or the like; a lanthanide element such as cerium (Ce), praseodymium (Pr), neodymium (Nd), terbium (Tb), erbium (Er), or the like; a metal element such as zinc (Zn), bismuth (Bi), or the like; a metalloid element such as arsenic (As), antimony (Sb), or the like; and a non-metal element such as selenium (Se) or the like. In addition, the colored oxide particle 22 may include the above-described types of elements in a form of oxides. For example, when the colored oxide particle 22 includes a vanadium (V) element, the colored oxide particle may include a vanadium oxide particle such as vanadium (IV) oxide ($V_2O_4$) or the like, when the colored oxide particle includes a tungsten (W) element, the colored oxide particle may include a tungsten oxide particle such as tungsten (III) oxide ($WO_3$) or the like, when the colored oxide particle 22 includes an iron (Fe) element, the colored oxide particle may include an iron oxide particle such as iron (III) oxide ($Fe_2O_3$) or the like, and when the colored oxide particle 22 include a bismuth (Bi) element, the colored oxide particle may include a bismuth oxide particle such as bismuth (III) oxide ($Bi_2O_3$) or the like.

Since an oxide containing the above-mentioned types of elements may be a colored oxide having a low brightness and may have a relatively dark color, the oxide-based solid electrolyte sheet 200 including the colored oxide particle 22 may have an excellent absorbance.

The oxide-based particle may include a lithium conductive oxide-based particle 21. For example, the oxide-based particle may include the lithium conductive oxide-based particle 21 as a basic material of oxide particle for the colored oxide particle 22. The lithium conductive oxide-based particle 21 may be a particle containing an oxygen element and in which a compound having conductivity for lithium ion is powdered, and the lithium conductive oxide-based particle 21 may include at least one compound selected from a garnet compound, a NASICON compound, and a perovskite compound.

The garnet compound may be a compound having a garnet crystal structure or a garnet-like crystal structure, and may be a lithium lanthanum zirconium oxide (LLZO)-based compound represented by a chemical formula such as $Li_7La_3Zr_2O_{12}$ or the like.

The NASICON compound may be a compound having a NASICON crystal structure or a NASICON-like crystal structure, and may be a lithium aluminum titanium phosphate (LATP)-based compound represented by a chemical formula such as $Li_{1.3}Al_{0.3}Ti_{1.7}(PO_4)_3$ or the like.

The perovskite compound may be a compound having a perovskite crystal structure or a perovskite-like crystal structure, and may be a lithium lanthanum titanate oxide (LLTO)-based compound represented by a chemical formula such as $Li_{0.31}La_{0.56}TiO_3$ or the like.

The lithium conductive oxide-based particle 21 may include at least one selected from zirconium (Zr), phosphate ($PO_4$), and titanium (Ti). For example, the lithium conductive oxide-based particle 21 may include at least one compound selected from a lithium lanthanum zirconium oxide (LLZO)-based compound, a lithium lanthanum titanate oxide (LLTO)-based compound, a lithium aluminum germanium phosphate (LAGP)-based compound, and a lithium aluminum titanium phosphate (LATP)-based compound. More specifically, the lithium conductive oxide-based particle 21 may be a lithium lanthanum zirconium oxide (LLZO)-based compound represented by a chemical formula of $Li_7La_3Zr_2O_{12}$ and having a garnet structure. When the above-described compound, specifically an LLZO-based compound is applied as the lithium conductive oxide-based particle 21, the oxide-based solid electrolyte sheet 200 having characteristics such as excellent ionic conductivity, stability with lithium metal, a wide potential window range, or the like may be prepared.

The oxide-based film sheet 20 may have a thickness of 10 μm to 300 μm. In some embodiments, the oxide-based film sheet 20 may have a thickness ranging from 30 μm to 200 μm or a thickness ranging from 30 μm to 100 μm. When the thickness of the oxide-based film sheet 20 is within the above range, it is possible to manufacture the oxide-based solid electrolyte sheet 200 that is thin and has excellent energy density, durability, or the like.

The oxide-based film sheet 20 may be manufactured by forming and drying a slurry containing the colored oxide particle 22 on a substrate 10.

The slurry may further include a binder. The binder is not particularly limited as long as the binder is a component that properly binds the oxide-based particle and contributes to improving adhesion of the slurry to the substrate, and examples thereof may include at least one compound selected from a polyacrylic resin, an ethyl cellulose, a methyl cellulose, a polyvinyl butyral resin, polyvinylidene fluoride, a carboxylic acid alkyl ester-based monomer, and an ethylenically unsaturated carboxylic acid monomer. In addition, when the slurry further includes the binder, an amount of the binder in the slurry may be 0.1 to 30% by weight.

The substrate 10 is not particularly limited, and may be a current collector in a form of a copper (Cu) foil or an aluminum (Al) foil, or may be a negative electrode or a positive electrode for the all-solid lithium secondary battery. Flexibility, a shape, a type, or the like of the substrate 10 may be appropriately selected in consideration of subsequent light-sintering process and slurry characteristics.

A method of forming the slurry on the substrate 10 is not particularly limited, and may be formed by a method such as bar coating, casting, spraying, or the like.

The slurry may be formed on the substrate 10 with a loading weight (LW) of 50 to 5000 $mg/cm^2$.

A method of drying the slurry formed on the substrate 10 is not particularly limited, and drying may be performed by a convection oven or the like. The drying may be performed at 50 to 200° C., or at 80 to 120° C. In addition, the drying may be performed for 0.5 hours to 5 hours, or for 1 hour to 3 hours.

The oxide-based film sheet 20 may have an L value of 80 or less according to a CIELAB color system. The L value represents brightness, when the L value is 0, this refers to perfect black, and when the L value is 100, this refers to perfect white. The oxide-based film sheet 20 including the colored oxide particle 22 may have an L value of 0 to 80 according to a CIELAB color system. Specifically, an L value of the oxide-based film sheet 20 decreases as an amount of added colored oxide particle 22 increases, resulting in a dark color.

Oxide-Based Solid Electrolyte Sheet 200

An oxide-based solid electrolyte sheet 200 according to an implementation may be manufactured by light-sintering an oxide-based film sheet 20 according to any one of the above-described embodiments. For example, the oxide-based solid electrolyte sheet 200 may be manufactured by light-sintering the oxide-based film sheet 20 including an oxide-based particle, and the oxide-based film sheet 20 may include a colored oxide particle 22. Detailed descriptions of the oxide-based film sheet 20, the light-sintering, the colored oxide particle 22, and the like overlap those described above, and thus description thereof will be omitted.

Figure 1B:
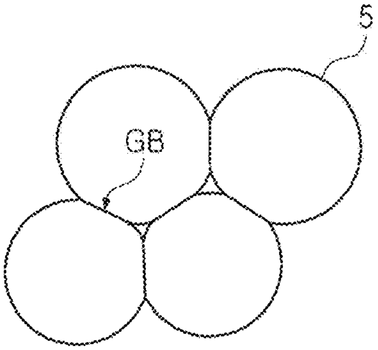
Figure 1C:
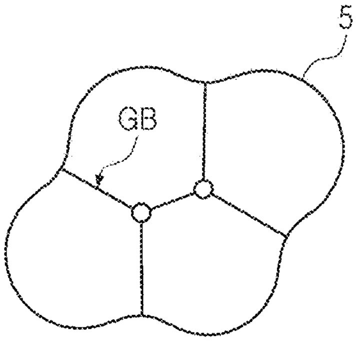
Figure 1D:
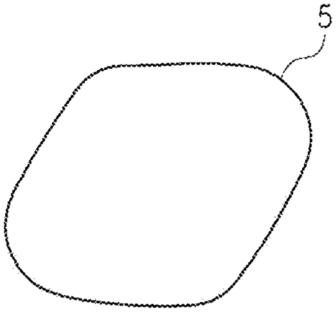

As described above, when the light-sintering is used, it is possible to perform sintering in a short period of time, and accordingly, it is possible to adjust a degree of sintering. This will be described in detail with reference to FIGS. 1A to 1D. During the sintering process, a contact area on a grain boundary GB between the particles 5 (a boundary on which the particles are in contact with each other) may gradually expand from a point contact form at an initial stage of the sintering as shown in FIG. 1A to a surface contact form as shown in FIGS. 1B and 1C. In FIG. 1D the sintering results in the particles not being distinguishable with any distinct boundary between them. As illustrated in FIG. 1A, in the point contact form in which each of the particles maintains an initial shape thereof, ions may receive great resistance during movement as it forms a simple contact. When the contact area increases by sintering to have the surface contact form, resistance of the ion movement path may be lowered, enabling fast ion conduction, and durability may increase due to densification to well maintain a sheet shape.

As the contact area between particles expands, a pore, which may be an empty space between the particles, may decrease and volumetric shrinkage may occur. In this case, a difference in volumetric shrinkage rate may occur depending on a contact type between the particles and a degree of roughness. Specifically, in a process in which a grain boundary (GB) is formed according to the sintering progress, a volumetric shrinkage rate may be within 3% (see FIG. 1B), while, as the sintering continues to progress, a contact area between the particles may increase, and in a process in which coarsening progresses, a volumetric shrinkage rate may increase from 10% to around 20% (see FIGS. 1C and 1D). In this manner, when a particle in the film is excessively coarsened and a volumetric shrinkage rate increases, problems such as deterioration of function due to separation from the substrate and/or cracking of the film, or the like, may occur.

Therefore, a contact form may be appropriately adjusted such that excessive coarsening and peeling due to volumetric shrinkage after sintering do not occur, but is required to maintain a surface contact state to secure a dense structure and an ion movement path, to have a structure in which ion conduction occurs (see FIG. 1B). In this regard, when the light-sintering process is applied, high-speed sintering is possible, and it is possible to form a particle shape as illustrated in FIG. 1B by controlling shapes of the particles according to adjustment of a degree of sintering. In addition, the particles may be appropriately coarsened, as needed, in consideration of flexibility, a shape, or the like of the substrate.

As the oxide-based solid electrolyte sheet 200 is manufactured by light-sintering the oxide-based film sheet 20, the oxide-based solid electrolyte sheet 200 may include a light-sintered colored oxide particle 222 as illustrated in FIG. 2B. The light-sintered colored oxide particle 222 may have shapes, colors, inter-particle connection structures, or the like, different from each other, as the colored oxide particle 22 is light-sintered.

The oxide-based solid electrolyte sheet 200 may include a light-sintered lithium conductive oxide-based particle 211. In the oxide-based solid electrolyte sheet 200 prepared by light-sintering the oxide-based film sheet 20 including the lithium conductive oxide-based particle 21, described above, the light-sintered lithium conductive oxide-based particle 211 may correspond to the lithium conductive oxide-based particle 21. The light-sintered lithium conductive oxide-based particle 211 may have shapes, colors, inter-particle connection structures, or the like, different from each other, as the lithium conductive oxide-based particle 21 is light-sintered.

The light-sintering may be performed in a pulsed method. The pulse method refers to a method of irradiating strong light generated instantaneously by applying a strong voltage as a pulse to a device such as a light-generating lamp or the like, and may generate heat by the irradiated and supplied light energy to induce light-sintering. In this case, a light-sintering device generating light in the pulsed method is not particularly limited as long as it operates under pulse conditions set as follows.

During the light-sintering, light irradiation time per pulse (on-time), operating voltage (V), duty cycle (%), cycle number, firing frequency (Hz) constituting the total pulse, repetition number, or the like may be appropriately changed (adjusted) by controlling a controller, a power supply, or the like of the light-sintering device.

During the light-sintering, the light irradiation time per pulse (on-time) may be 1000 to 4500 μs. Specifically, the light irradiation time per pulse (on-time) may be 1200 μs or more, or 1400 μs or more, and may be 4400 μs or less, 4200 μs or less, or 4000 μs or less.

During the light-sintering, the operating voltage (V) may be 100 to 450 V. Specifically, the operating voltage (V) may be 120 V or more, or 150 V or more, and may be 440 V or less, 430 V or less, or 420 V or less.

During the light-sintering, the duty cycle (%) may be 10 to 100%. Specifically, the duty cycle (%) may be 20 to 90%. The duty cycle may be calculated as a value of a ratio (%) of the light irradiation time (on-time) per pulse to a pulse period.

The number of cycles during the light-sintering may be 1 to 20 times. Specifically, the number of cycles during the light-sintering may be 5 to 15 times.

When the light irradiation time (on-time), the operating voltage (V), the duty cycle (%), and the cycle number during the light-sintering are controlled within the above range, a light-sintering process time calculated by Equation 1 below may be shortened. Therefore, the sintering process may be carried out in a short period of time.

$$T_s = C/T_r \quad \text{[Equation 1]}$$

In Equation 1, $T_s$ is a light-sintering process time (s), $T_r$ is a firing frequency (Hz), and C is the number of repetitions.

During the light-sintering, the firing frequency (Hz) constituting the total pulse may be 1 to 50 Hz. Specifically, the firing frequency (Hz) constituting the total pulse during the light-sintering may be 10 Hz or more, and may be 40 Hz or less.

The number of repetitions during the light-sintering may be 50 to 1000 times. Specifically, the number of repetitions during the light-sintering may be 100 or more, and may be 400 or less.

During the light-sintering, a temperature of the substrate may be maintained 300° C. or lower. Specifically, during the light-sintering, the temperature of the substrate may be maintained at 5 to 100° C., 10 to 50° C., or 15 to 30° C. More specifically, during the light-sintering, the temperature of the substrate may be maintained at room temperature (RT) of substantially 20 to 25° C. When the temperature of the substrate is maintained within the above-described ranges during light-sintering, it is possible to prevent thermal stress from remaining on the substrate, thereby substantially mitigating occurrence of problems such as destruction of the substrate, decrease in durability, or the like, and may be applied to the light-sintering process by selecting various types of substrates without restrictions.

Light energy irradiated during the light-sintering may be 25 to 150 J/s·cm$^2$. Specifically, the light energy irradiated during the light-sintering may be 40 to 120 J/s·cm$^2$.

The oxide-based solid electrolyte sheet 200 may have an area of 0.25 cm$^2$ or more. Specifically, the oxide-based solid electrolyte sheet 200 may have an area of 0.5 to 50 cm$^2$.

A width and a length of the oxide-based solid electrolyte sheet 200 may be 0.5 cm or more, respectively. Specifically, the oxide-based solid electrolyte sheet 200 may have a width and a length of 0.5 to 10 cm, respectively.

When the area, the width, the length, or the like of the oxide-based solid electrolyte sheet is in the above-described range, the oxide-based solid electrolyte sheet may have a relatively large area and size, as compared to the oxide-based solid electrolyte sheet produced by the conventional process, and manufacturing productivity, economic feasibility, or the like of the oxide-based solid electrolyte sheet may be better.

The oxide-based solid electrolyte sheet 200 may have a thickness of 10 μm to 300 μm. Specifically, the oxide-based solid electrolyte sheet 200 may have a thickness ranging from 30 μm to 200 μm, or a thickness ranging from 30 μm to 100 μm. When the thickness of the oxide-based solid electrolyte sheet 200 is within the above-mentioned range, the oxide-based solid electrolyte sheet 200 may be a film having excellent ion conductivity, and may secure higher energy density, when applied to an all-solid lithium secondary battery.

The oxide-based film sheet 20 may be located on the substrate 10, and the oxide-based solid electrolyte sheet 200 may be manufactured by light-sintering the oxide-based film sheet 20. Hereinafter, a structure in which a substrate and a sintered oxide-based solid electrolyte sheet on the substrate are formed may be also referred to as a solid electrolyte structure. For example, a solid electrolyte structure according to an embodiment may include the substrate and the sintered oxide-based solid electrolyte sheet on the substrate.

In this case, when performing EDS analysis of the solid electrolyte structure on a surface of the oxide-based solid electrolyte sheet 200, an amount of an element contained in the oxide-based solid electrolyte sheet 200 may be 92 at % or more. In some embodiments, an amount of an element contained in the oxide-based solid electrolyte sheet 200 may be 95 at % to 100 at %, 99 at % to 99.999 at %, or 99.5 at % to 99.9 at %.

When the oxide-based solid electrolyte sheet 200 is formed of a slurry containing a binder, an amount of a binder burning residue contained in the oxide-based solid electrolyte sheet 200 may be 10 at % to 80 at %, or 20 at % to 60 at %. For example, the binder burning residue may be a carbon atom (C), and a detailed description of the binder will be omitted because of overlapping the above descriptions.

When amounts of an element and/or the binder burning residue included in the substrate 10 are within the above-described range, it can be confirmed that the oxide-based solid electrolyte sheet 200 is manufactured through a smooth light-sintering process such that element diffusion between the substrate and the sheet is suppressed, and formation of an interface and an increase in resistance between the substrate and the sheet are substantially suppressed.

The element distribution in the oxide-based solid electrolyte sheet 200 may be confirmed by quantitatively analyzing an amount of an added material by a surface analysis method such as energy dispersive X-ray spectroscopy (EDS) or electron energy loss spectroscopy (EELS). Specifically, a surface of the oxide-based solid electrolyte sheet (i.e., a surface parallel to a surface contacting the substrate) may be analyzed by performing EDS analysis in a thickness direction.

The oxide-based solid electrolyte sheet 200 may have a porosity of 0.1 to 40%. Specifically, the oxide-based solid electrolyte sheet 200 may have a porosity of 1% or more, or 8% or more, and may be 35% or less. When the porosity of the oxide-based solid electrolyte sheet 200 is within the above range, it can be determined that the light-sintering proceeds smoothly.

Ionic conductivity of the oxide-based solid electrolyte sheet 200 may be $10^{-6}$ S/cm to $10^{-2}$ S/cm, specifically $10^{-5}$ S/cm to $10^{-2}$ S/cm, and more specifically, $10^{-5}$ S/cm to $10^{-3}$ S/cm. In this case, a value of the ion conductivity may be a value measured at room temperature (25° C.).

The oxide-based solid electrolyte sheet 200 may include at least one selected from zirconium (Zr), phosphate ($PO_4$), and titanium (Ti).

The oxide-based solid electrolyte sheet 200 may include at least one element selected from a transition metal element such as chromium (Cr), manganese (Mn), cobalt (Co), nickel (Ni), copper (Cu), niobium (Nb), molybdenum (Mo) ruthenium (Ru), rhodium (Rh), palladium (Pd), vanadium (V), tungsten (W), iron (Fe), or the like; a lanthanide element such as cerium (Ce), praseodymium (Pr), neodymium (Nd), terbium (Tb), erbium (Er), or the like; a metal element such as zinc (Zn), bismuth (Bi), or the like; a metalloid element such as arsenic (As), antimony (Sb), or the like; and a non-metal element such as selenium (Se) or the like. Specifically, as the oxide-based solid electrolyte sheet 200 is manufactured by light-sintering the oxide-based film sheet 20 including the colored oxide particle 22, an element included in the colored oxide particle 22 may be included as it is. In addition, the oxide-based solid electrolyte sheet 200 may include the above-described types of elements as oxides thereof. Detailed descriptions of the above-mentioned types of elements and the oxides thereof will be omitted because of overlapping the above descriptions.

The oxide-based solid electrolyte sheet 200 may include at least one selected from zirconium (Zr), phosphate ($PO_4$), and titanium (Ti); and at least one element selected from chromium (Cr), manganese (Mn), cobalt (Co), nickel (Ni), copper (Cu), niobium (Nb), molybdenum (Mo), ruthenium (Ru), rhodium (Rh), palladium (Pd), vanadium (V), tungsten (W), iron (Fe), cerium (Ce), praseodymium (Pr), neodymium (Nd), terbium (Tb), erbium (Er), zinc (Zn), bismuth (Bi), arsenic (As), antimony (Sb), and selenium (Se).

All-Solid Lithium Secondary Battery

An all-solid lithium secondary battery according to an embodiment may include the oxide-based solid electrolyte sheet 200 according to any one of the above-described embodiments.

An all-solid lithium secondary battery according to another implementation may include the solid electrolyte structure according to any one of the above-described embodiments. In this case, the substrate may be a positive electrode or a negative electrode for the all-solid lithium secondary battery. Specifically, the all-solid lithium secondary battery may include the oxide-based solid electrolyte sheet 200 between the positive electrode and the negative electrode for the all-solid lithium secondary battery.

The positive electrode is not particularly limited, and the positive electrode may include a positive electrode current collector and a positive electrode mixture layer disposed on at least one surface of the positive electrode current collector.

The positive electrode current collector may include stainless steel, nickel, aluminum, titanium, or an alloy thereof. The positive electrode current collector may include aluminum or stainless steel surface-treated with carbon, nickel, titanium, or silver. A thickness of the positive electrode current collector may be illustratively, 10 to 50 μm, but is not limited thereto.

The positive electrode mixture layer may include a positive electrode active material. The positive electrode active material may include a compound capable of reversibly intercalating and deintercalating a lithium ion.

According to embodiments, the positive electrode active material may include a lithium-nickel metal oxide. The lithium-nickel metal oxide may further include at least one of cobalt (Co), manganese (Mn), or aluminum (Al).

In some embodiments, the positive electrode active material or the lithium-nickel metal oxide may include a layered structure or a crystal structure represented by Formula 1 below.

$$Li_xNi_aM_bO_{2+z} \quad \text{[Formula 1]}$$

In some embodiments, in Formula 1, $0.9 \le x \le 1.2$, $0.6 \le a \le 0.99$, $0.01 \le b \le 0.4$, and $-0.5 \le z \le 0.1$ may be satisfied. As noted above, M may include Co, Mn and/or Al.

A chemical structure represented by Formula 1 may indicate a bonding relationship included in the layered structure or crystal structure of the positive electrode active material, and may not exclude other additional elements. For example, M may include Co and/or Mn, and Co and/or Mn together with Ni may serve as main active elements of the positive electrode active material. Formula 1 may be provided to express the bonding relationship of the main active elements, and should be understood as a formula encompassing introduction and substitution of additional elements.

In an embodiment, in addition to the main active element, an auxiliary element for enhancing chemical stability of the positive electrode active material or the layered structure/crystal structure may be further included. The auxiliary element may be incorporated into the layered structure/crystal structure to form a bond, and it should be understood that this case is also included within the chemical structure represented by Formula 1.

The auxiliary element may include, for example, at least one of Na, Mg, Ca, Y, Ti, Hf, V, Nb, Ta, Cr, Mo, W, Fe, Cu, Ag, Zn, B, Al, Ga, C, Si, Sn, Sr, Ba, Ra, P, or Zr. The auxiliary element may act as an auxiliary active element that contributes to capacity/output activity of the positive electrode active material along with Co or Mn, such as Al.

For example, the positive electrode active material or the lithium-nickel metal oxide may include a layered structure or a crystal structure represented by Formula 1-1 below.

$$Li_xNi_aM1_{b1}M2_{b2}O_{2+z} \quad \text{[Formula 1-1]}$$

In Formula 1-1, M1 may include Co, Mn and/or Al. M2 may include the aforementioned auxiliary elements. In Formula 1-1, the following may also be satisfied $0.9 \le x \le 1.2$, $0.6 \le a \le 0.99$, $0.01 \le b1+b2 \le 0.4$, and $-0.5 \le z \le 0.1$.

The positive electrode active material may further include a coating element and/or a doping element. For example, elements substantially the same as or similar to the above-mentioned auxiliary elements may be used as the coating element and/or the doping element. For example, one of the above elements or a combination of two or more may be used as the coating element and/or the doping element.

The coating element and/or the doping element may be present on a surface of the lithium-nickel metal oxide particle, or may be introduced through the surface of the lithium-nickel metal oxide particle to be included in the bonding structure represented by Formula 1 or Formula 1-1.

The positive electrode active material may include a nickel-cobalt-manganese (NCM)-based lithium oxide. The NCM-based lithium oxide may have an increased nickel content.

The nickel (Ni) may serve as a transition metal related to the output and capacity of a lithium secondary battery. Therefore, as described above, a high-Ni composition for the positive electrode active material may be used to provide a high-capacity positive electrode and a high-capacity lithium secondary battery.

However, as the nickel amount increases, long-term storage stability and lifetime stability of the positive electrode and/or the secondary battery may relatively deteriorate, and side reaction with an electrolyte may also increase. According to embodiments, life stability and capacity retention characteristics may be improved through Mn while maintaining electrical conductivity by including Co.

The amount of Ni (e.g., a mole fraction of nickel among the total moles of nickel, cobalt, and manganese) in the NCM-based lithium oxide may be 0.6 or more, 0.7 or more, or 0.8 or more. In some embodiments, the amount of Ni may be 0.8 to 0.95, 0.82 to 0.95, 0.83 to 0.95, 0.84 to 0.95, 0.85 to 0.95, or 0.88 to 0.95.

In some embodiments, the positive electrode active material may include a lithium cobalt oxide-based active material, a lithium manganese oxide-based active material, a lithium nickel oxide-based active material, or a lithium iron phosphate (LFP) active material (e.g., $LiFePO_4$).

In some embodiments, the positive electrode active material may include a Mn-rich active material having a chemical structure or crystal structure represented by Formula 2, a Li-rich layered oxide (LLO)/over-lithiated oxide (OLO) active material, or a Co-less active material.

$$p[Li_2MnO_3]\cdot(1-p)[Li_qJO_2] \quad \text{[Formula 2]}$$

In Formula 2, $0<p<1$, $0.9 \le q \le 1.2$, and J may include at least one element selected from Mn, Ni, Co, Fe, Cr, V, Cu, Zn, Ti, Al, Mg, and B.

A method of manufacturing the positive electrode is not particularly limited. For example, a positive electrode slurry may be prepared by mixing a positive electrode active material in a solvent. After the positive electrode slurry may be coated on a positive electrode current collector, a positive electrode mixture layer may be prepared by drying and rolling the same. The coating process may be carried out in a process such as gravure coating, slot die coating, multi-layer simultaneous die coating, imprinting, doctor blade coating, dip coating, bar coating, casting, or the like, but is not limited thereto. The positive electrode mixture layer may further include a binder, and may optionally further include a conductive material, a thickener, or the like.

As non-limiting examples of a solvent used in preparation of the positive electrode mixture layer, N-methyl-2-pyrrolidone (NMP), dimethylformamide, dimethylacetamide, N,N-dimethylaminopropylamine, ethylene oxide, tetrahydrofuran, or the like be included.

The binder may include polyvinylidenefluoride (PVDF), vinylidene fluoride-hexafluoropropylene copolymer (poly(vinylidene fluoride-co-hexafluoropropylene)), polyacrylonitrile, polymethylmethacrylate, an acrylonitrile butadiene rubber (NBR), a polybutadiene rubber (BR), a styrene-butadiene rubber (SBR), or the like. In an embodiment, a PVDF-based binder may be used as a positive electrode binder.

The conductive material may be added to improve conductivity and/or mobility of a lithium ion or an electron of the positive electrode mixture layer. For example, the conductive material may include a carbon-based conductive material such as graphite, carbon black, acetylene black, Ketjen black, graphene, carbon nanotube, vapor-grown carbon fiber (VGCF), or carbon fiber, and/or a metal-based conductive material such as tin, tin oxide, titanium oxide, $LaSrCoO_3$, $LaSrMnO_3$, a perovskite material, or the like, but is not limited thereto.

In some embodiments, the positive electrode mixture layer may further include a thickener and/or a dispersant, or the like. In an embodiment, the positive electrode mixture layer may include a thickener such as, for example, carboxymethyl cellulose (CMC).

The negative electrode is not particularly limited, and the negative electrode may include a negative electrode current collector and a negative electrode mixture layer disposed on at least one surface of the negative electrode current collector.

Non-limiting examples of the negative electrode current collector may include a copper foil, a nickel foil, a stainless steel foil, a titanium foil, a nickel foam, a copper foam, a polymer substrate coated with a conductive metal, or the like. A thickness of the negative electrode current collector may be, for example, 10 to 50 μm, but is not limited thereto.

The negative electrode mixture layer may include a negative electrode active material. A material capable of adsorbing and desorbing a lithium ion may be used as the negative electrode active material. For example, the negative electrode active material may be a carbon-based material such as crystalline carbon, amorphous carbon, carbon composite, carbon fiber, or the like; a lithium metal; a lithium alloy; a silicon (Si)-containing material or a tin (Sn)-containing material, or the like.

Examples of the amorphous carbon may include hard carbon, soft carbon, coke, mesocarbon microbead (MCMB), mesophase pitch-based carbon fiber (MPCF), or the like.

Examples of the crystalline carbon may include graphite-based carbon such as natural graphite, artificial graphite, graphitized coke, graphitized MCMB, graphitized MPCF, or the like.

The lithium metal may include a pure lithium metal, or a lithium metal with a protective layer formed thereon to inhibit dendrite growth. In an implementation, a lithium metal-containing layer deposited or coated on the negative electrode current collector may be used as a negative electrode active material layer. In an embodiment, a lithium film layer may be used as the negative electrode active material layer.

Examples of elements included in the lithium alloy include aluminum, zinc, bismuth, cadmium, antimony, silicon, lead, tin, gallium, indium, or the like.

The silicon-containing material may provide increased capacity characteristics. The silicon-containing material may include Si, $SiO_x$ ($0<x<2$), metal-doped $SiO_x$ ($0<x<2$), a silicon-carbon composite, or the like. The metal may include lithium and/or magnesium, and the metal-doped $SiO_x$ ($0<x<2$) may include metal silicate.

A method of manufacturing the negative electrode is not particularly limited. For example, a negative electrode slurry may be prepared by mixing a negative electrode active material in a solvent. After coating/depositing the negative electrode slurry on a negative electrode current collector, a negative electrode mixture layer may be prepared by drying and rolling the same. The coating process may be carried out in a process such as gravure coating, slot die coating, multi-layer simultaneous die coating, imprinting, doctor blade coating, dip coating, bar coating, casting, or the like, but is not limited thereto. The negative electrode mixture layer may further include a binder, and may optionally further include a conductive material, a thickener, or the like.

In some embodiments, the negative electrode may include a lithium metal type negative electrode active material layer formed by a deposition/coating process.

Non-limiting examples of a solvent for a negative electrode mixture include water, pure water, deionized water, distilled water, ethanol, isopropanol, methanol, acetone, n-propanol, t-butanol, or the like.

For the binder, the conductive material, and the thickener of the negative electrode, the above-described materials for manufacturing the positive electrode may also be used.

In some embodiments, as the negative electrode binder, a styrene-butadiene rubber (SBR)-based binder, a carboxymethyl cellulose (CMC)-based binder, a polyacrylic acid-based binder, a poly(3,4-ethylenedioxythiophene) (PEDOT)-based binder, or the like may be used. A method of manufacturing the all-solid lithium secondary battery is not particularly limited, but a slurry containing a negative electrode active material or a positive electrode active material may be formed on a current collector, a process such as drying, rolling, or the like, for the same may be carried out to prepare a positive electrode or a negative electrode, respectively, a slurry containing a colored oxide particle or the like may be formed on the positive electrode or the negative electrode, and an all-solid lithium secondary battery may be manufactured by an light-sintering process performed on a resulting dried oxide-based film sheet 20 to obtain an oxide-based solid electrolyte sheet 200.

When the all-solid lithium secondary battery includes the oxide-based solid electrolyte sheet 200 described above, there may be no risk of ignition due to leakage of an electrolyte, and excellent performance such as high energy density or the like may be obtained.

EXAMPLE

1. Production of Oxide-Based Film Sheet

(1) Inventive Example

A slurry for an oxide-based film sheet was prepared by adding and mixing 1% by weight of colored oxide particle ($Fe_2O_3$) to a slurry containing lithium lanthanum zirconium oxide (LLZO; $Li_7La_3Zr_2O_{12}$) particles and a binder (Electroscience 441), based on a total weight of the lithium lanthanum zirconium oxide (LLZO; $Li_7La_3Zr_2O_2$) particles and the colored oxide particle ($Fe_2O_3$). In this case, a weight ratio between powder particles (the lithium lanthanum zirconium oxide (LLZO; $Li_7La_3Zr_2O_{12}$) particles and colored oxide particle ($Fe_2O_3$)) and the binder contained in the slurry was set as 1:1.5.

The slurry was cast on a substrate (a Cu-foil current collector) having a thickness of 20 μm at a loading weight (LW) of 2000 $mg/cm^2$, and then dried in a convection oven at 100° C. for 2 hours, to prepare an oxide-based film sheet having a thickness of about 40 μm.

(2) Comparative Example

An oxide-based film sheet of Comparative Example was prepared in the same manner as in the above Example, except that a slurry containing no colored oxide particle was applied.

2. Production of Oxide-Based Solid Electrolyte Sheet

The oxide-based film sheets of the above Inventive Example and the Comparative Example were cut to a size of 0.5 cm×0.5 cm, and were loaded into a light-sintering equipment (Novacentrix PulseForge Invent). Thereafter, light-sintering was performed on the oxide-based film sheets, according to light-sintering conditions illustrated in Table 1 below, to prepare solid electrolyte structures having oxide-based solid electrolyte sheets having a thickness of about 40 μm on a substrate. Surfaces of the oxide-based solid electrolyte sheets prepared in Inventive Examples and Comparative Examples were observed by a microscope, and are illustrated in FIGS. 3A and 4A (10 μm standard), and FIGS. 3B and 4B (50 μm standard), respectively. In this case, a temperature of the substrate was maintained at room temperature (RT) of 20 to 25° C.

TABLE 1

| Light-Sintering Conditions | | |
|---|---|---|
| Conditions constituting | Voltage<br>On-Time | 300 V<br>3000 μs |

TABLE 1-continued

| Light-Sintering Conditions | | |
|---|---|---|
| Single Pulse | Duty Cycle | 60% |
| | Cycle Number | 10 |
| Operating Conditions | Firing Frequency | 25 Hz |
| | Number of Repetitions | 250 |
| | Irradiated Light Energy | 75 J/s · cm$^2$ |

3. Evaluation of Oxide-Based Solid Electrolyte Sheet

(1) Analysis of Elemental Distribution within Sheet

For the solid electrolyte structure prepared in the Inventive Example, images and C K-α analysis results obtained by performing EDS analysis of a surface of the oxide-based solid electrolyte sheet by an energy spectroscopy detector (EDS) attached to SEM equipment (SEC SNE-4500M plus), are illustrated in FIGS. 5A and 5B (Inventive Example) and FIGS. 6A and 6B (Comparative Example). Analysis results of elemental distribution in specific sheets of the Inventive Example and the Comparative Example are illustrated in Table 2 below.

TABLE 2

| Inventive Example | | Comparative Example | |
|---|---|---|---|
| Element | At % | Element | At % |
| O | 40.31 | O | 77.34 |
| C | 51.98 | — | — |
| La | 3.41 | La | 8.41 |
| Zr | 3.53 | Zr | 12.36 |
| Al | 0.77 | Al | 1.89 |
| Total | 100 | Total | 100 |

(2) Sheet Porosity Analysis

Porosity analysis was performed on the prepared oxide-based solid electrolyte sheets through Image J software, and sheet void distribution of the Inventive Example and the Comparative Example are illustrated in FIGS. 7A and 7B. In addition, sheet porosity values of the Inventive Example and the Comparative Example are illustrated in Table 3 below.

TABLE 3

| | Porosity (%) |
|---|---|
| Inventive Example | 27.689 |
| Comparative Example | 7.389 |

Referring to FIGS. 3A to 7B and Tables 1 and 2, in the solid electrolyte structure of Comparative Example formed of the oxide-based film sheet not containing colored oxide particle, upon EDS analysis of a surface of the oxide-based solid electrolyte sheet, it was found that since sintering by light-sintering did not proceed smoothly, a used binder component still remained after the light-sintering, and since carbonization of the binder did not occur due to heat treatment by light, a carbon component was not detected. The remaining binder is an insulator with little conductivity, and thus may hinder effective ion transfer in terms of electrochemical characteristics.

Upon EDS analysis of a surface of the oxide-based solid electrolyte sheet in the solid electrolyte structure of the Inventive Example, a relatively high content of carbon atoms (C), which may be a binder burning residue, was detected, and a portion from which the binder component is removed may form a porous structure and may have a relatively high porosity compared to a sheet containing no colored oxide particle (see Table 3). Considering these results, in the oxide-based solid electrolyte sheet formed of the film sheet containing the colored oxide particle, sintering by light-sintering may proceed smoothly, may have an appropriate porosity, may bring advantages in terms of electrochemical characteristics, and may be determined that diffusion of elements between the current collector and the sheet is prevented by the sintering in a relatively short time.

(3) Sheet Absorbance Analysis

The oxide-based solid electrolyte sheets prepared by changing amounts of the colored oxide particle were subjected to absorbance analysis at a wavelength of 200 to 1200 nm using UV-Vis equipment (V-770 from Jasco), and results therefrom are illustrated in FIG. 8. Specifically, V0 is an absorbance analysis result for the sheet (Comparative Example) formed of the oxide-based film sheet containing no colored oxide particle, V1 is an absorbance analysis result for the sheet (Inventive Example) formed of the oxide-based film sheet containing 1% by weight of the colored oxide particle based on a total amount of oxide-based particles. In addition, V5 and V10 may be absorbance analysis results for sheets formed of an oxide-based film sheets containing colored oxide particle at 5% by weight and 10% by weight, respectively, based on a total amount of oxide-based particles.

Referring to FIG. 8, a higher difference in absorbance was found in the samples (V1, V5, and V10) to which the colored oxide particle were added, as compared to the sample (V0) to which the colored oxide particle were not added. Considering this, it may be determined that when the colored oxide particle were appropriately added, the light sintering characteristics may be appropriately controlled by easily adjusting absorbance in a wide wavelength range, as needed.

(4) Analysis of Sheet Ionic Conductivity

Electrochemical impedance analysis was performed on the prepared oxide-based solid electrolyte sheet in an air atmosphere at room temperature (25° C.) by a potentiostat (VMP-300), and resistance components of Inventive Example and Comparative Example were measured according to Equation 2 below. Results of calculating and comparing the ionic conductivities are illustrated in FIG. 9.

$$\sigma=D/(R\times S) \quad \text{[Equation 2]}$$

In Equation 2, σ is a value of ion conductivity (S/cm), D is a thickness of the oxide-based solid electrolyte sheet (cm), R is a value of a measured impedance resistance (1/S), and S is an area of the oxide-based solid electrolyte sheet (cm$^2$).

Referring to FIG. 9, after light-sintering, in the sample of Comparative Example without adding colored oxide particle, ion conductivity was $2.78\times10^{-7}$ S/cm, and in the sample of Inventive Example adding colored oxide particle, ion conductivity was $1.29\times10^{-5}$ S/cm. Therefore, the sample of Inventive Example in which the colored oxide particle was added showed about 50 times better ion conductivity.

According to an embodiment of the disclosure, an oxide-based solid electrolyte sheet in which a connection structure between particles, shapes of the particles, porosity, or the like is appropriately provided may be prepared.

According to another embodiment of the disclosure, an oxide-based solid electrolyte sheet having excellent durability and ion conductivity may be manufactured.

According to another embodiment of the disclosure, an oxide-based solid electrolyte sheet may be manufactured without peeling from a substrate or the like.

According to another embodiment of the disclosure, an oxide-based solid electrolyte sheet may be manufactured in a short period of time without loss of a material such as lithium or the like or destruction of a substrate.

According to another embodiment of the disclosure, an oxide-based solid electrolyte sheet may be thinned and enlarged in area without additional processing.

According to another embodiment of the disclosure, performance of an oxide-based solid electrolyte sheet may be improved by suppressing formation of an interface and an increase in resistance due to element diffusion between a substrate and the sheet.

According to another embodiment of the disclosure, an all-solid lithium secondary battery having excellent safety, energy density, and the like, including an oxide-based solid electrolyte sheet having excellent performance, may be provided.

Only specific examples of implementations of certain embodiments may be described. Variations, improvements and enhancements of the disclosed embodiments and other embodiments may be made based on the disclosure.

What is claimed is:

1. A lithium conductive oxide-based solid electrolyte sheet after sintering, comprising:
- lithium conductive oxide-based particles, and
- colored oxide particles,
- wherein the lithium conductive oxide-based particles comprise at least one compound selected from a garnet compound, a lithium aluminum titanium phosphate (LATP)-based compound, a lithium aluminum germanium phosphate (LAGP)-based compound, and a perovskite compound, and
- the colored oxide particles comprise an oxide of at least one element selected from molybdenum (Mo), iron (Fe), praseodymium (Pr), and terbium (Tb),
- wherein the colored oxide particles and the lithium conductive oxide-based particles are in direct surface-to-surface contact with each other, and
- wherein the sintering is performed by light-sintering.

2. The lithium conductive oxide-based solid electrolyte sheet of claim 1, wherein the light-sintering is performed in a pulsed method.

3. The lithium conductive oxide-based solid electrolyte sheet of claim 2, wherein light irradiation time per pulse (on-time) during the light-sintering is 1000 to 4500 μs.

4. The lithium conductive oxide-based solid electrolyte sheet of claim 2, wherein an operating voltage during the light-sintering is 100 to 450 V.

5. The lithium conductive oxide-based solid electrolyte sheet of claim 1, wherein a temperature of a substrate during the light-sintering is maintained at 300° C. or less.

6. The lithium conductive oxide-based solid electrolyte sheet of claim 1, wherein light energy irradiated during the light-sintering is 25 to 150 $J/s \cdot cm^2$.

7. The lithium conductive oxide-based solid electrolyte sheet of claim 1, having an area of 0.25 $cm^2$ or more and a thickness of 10 to 300 μm.

8. The lithium conductive oxide-based solid electrolyte sheet of claim 1, having a porosity of 0.1 to 40% and an ionic conductivity of $10^{-6}$ S/cm to $10^{-2}$ S/cm.

9. A solid electrolyte structure comprising:
- a substrate; and
- a lithium conductive oxide-based solid electrolyte sheet, after sintering, present on the substrate,
- wherein the lithium conductive oxide-based solid electrolyte sheet comprises colored oxide particles comprising an oxide of at least one element selected from molybdenum (Mo), iron (Fe), praseodymium (Pr), and terbium (Tb), and lithium conductive oxide-based particles comprising at least one compound selected from a garnet compound, a lithium aluminum titanium phosphate (LATP)-based compound, a lithium aluminum germanium phosphate (LAGP)-based compound, and a perovskite compound,
- wherein the colored oxide particles and the lithium conductive oxide-based particles are in direct surface-to-surface contact with each other,
- the lithium conductive oxide-based solid electrolyte sheet has a porosity of 0.1 to 40% and an ionic conductivity of $10^{-6}$ S/cm to $10^{-2}$ S/cm, and
- the lithium conductive oxide-based solid electrolyte sheet has an area of 0.25 $cm^2$ or more and a thickness of 10 to 300 μm,
- wherein, upon energy dispersive X-ray spectroscopy (EDS) analysis of a surface of the lithium conductive oxide-based solid electrolyte sheet, an amount of a binder burning residue contained in the lithium conductive oxide-based solid electrolyte sheet is 10 at % to 80 at %.

10. The solid electrolyte structure of claim 9, wherein the lithium conductive oxide-based solid electrolyte sheet further comprises:
- at least one selected from zirconium (Zr), phosphate ($PO_4$), and titanium (Ti).

11. An all-solid lithium secondary battery comprising the solid electrolyte structure of claim 9.

12. The lithium conductive oxide-based solid electrolyte sheet of claim 1, wherein, upon energy dispersive X-ray spectroscopy (EDS) analysis of a surface of the lithium conductive oxide-based solid electrolyte sheet, an amount of a binder burning residue contained in the lithium conductive oxide-based solid electrolyte sheet is 10 at % to 80 at %.

13. The lithium conductive oxide-based solid electrolyte sheet of claim 1, further comprising at least one selected from zirconium (Zr), phosphate ($PO_4$), and titanium (Ti).

* * * * *